(12) United States Patent
Liverman et al.

(10) Patent No.: US 7,908,719 B2
(45) Date of Patent: Mar. 22, 2011

(54) PACKAGE FASTENING CLIP WITH TAMPER EVIDENT FEATURE

(75) Inventors: Ivan Neil Liverman, Middlesex, NC (US); Mark Edmund Maresh, Wake Forest, NC (US); Robert Tucker Sanders, Raleigh, NC (US); Eric Allen Stegner, Durham, NC (US); Robert William Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 11/953,059

(22) Filed: Dec. 9, 2007

(65) Prior Publication Data

US 2009/0144951 A1 Jun. 11, 2009

(51) Int. Cl.
*A44B 17/00* (2006.01)
(52) U.S. Cl. .......... 24/453; 24/458; 24/704.1; 24/704.2; 220/324
(58) Field of Classification Search ................. 24/704.1, 24/704.2, 453, 458, 487; 220/4.33, 234, 220/324
See application file for complete search history.

(56) References Cited

U.S. PATENT DOCUMENTS

| | | | |
|---|---|---|---|
| 2,946,612 A | 7/1960 | Ahlgren | |
| 3,455,480 A | 7/1969 | Mitchell et al. | |
| 3,968,895 A | 7/1976 | Barnes, Jr. et al. | |
| 4,101,052 A | 7/1978 | Dove | |
| 4,239,149 A | 12/1980 | Kiupersmit | |
| 4,252,266 A | 2/1981 | Kupersmit | |
| 4,358,048 A | 11/1982 | Kupersmit | |
| 4,786,225 A * | 11/1988 | Poe et al. | 24/453 |
| 5,103,538 A * | 4/1992 | Ryder | 24/453 |
| 5,123,541 A | 6/1992 | Giannini et al. | |
| 5,231,246 A * | 7/1993 | Benson et al. | 24/464 |
| 5,862,917 A | 1/1999 | Noble et al. | |
| 6,412,153 B1 | 7/2002 | Khachadourian et al. | |
| 7,240,406 B1 | 7/2007 | Liverman et al. | |
| 7,480,968 B2 * | 1/2009 | Maresh et al. | 24/453 |

* cited by examiner

*Primary Examiner* — Robert J Sandy
(74) *Attorney, Agent, or Firm* — Steven L. Bennett; Daniel E. McConnell

(57) ABSTRACT

A product package clip has tamper evident protection which is formed integrally with the clip. Breakage of a frangible occluding portion indicates that the integrity of the package has been jeopardized.

10 Claims, 2 Drawing Sheets

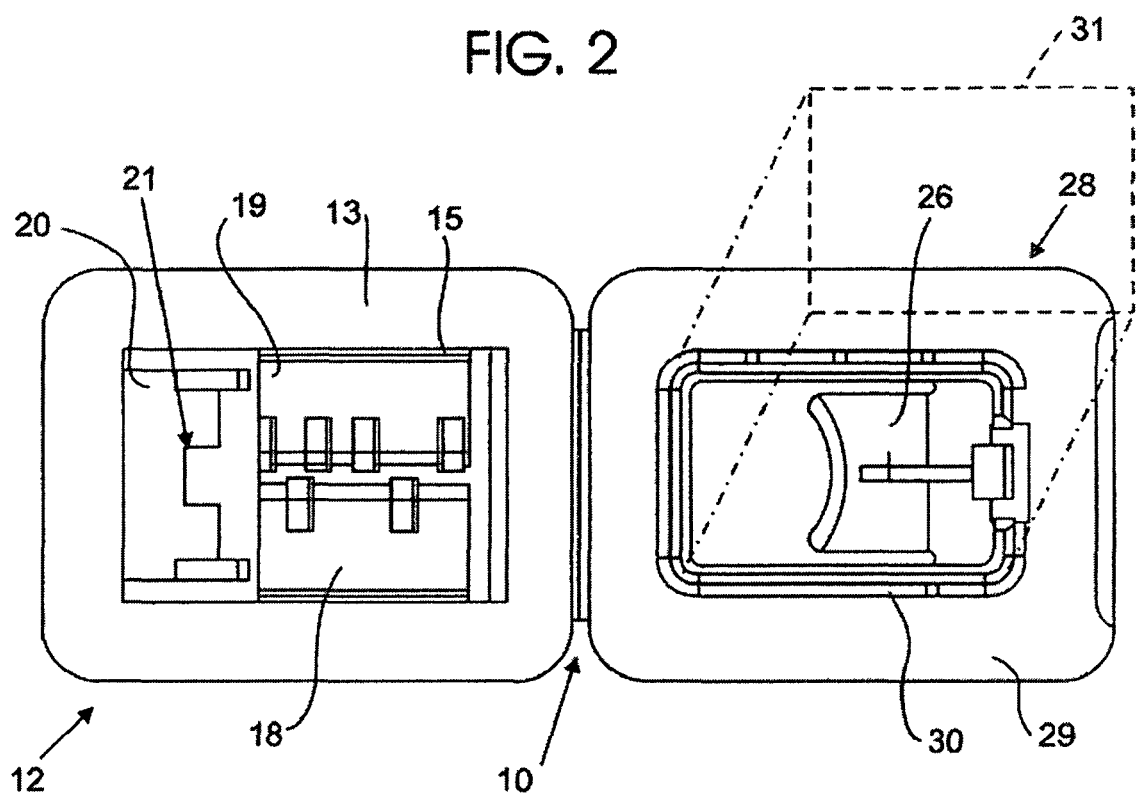
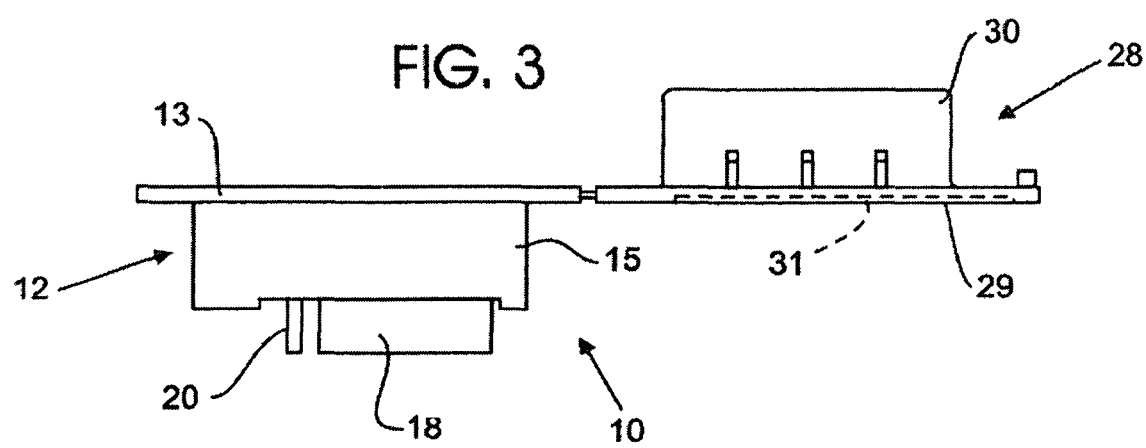

PACKAGE FASTENING CLIP WITH TAMPER EVIDENT FEATURE

FIELD AND BACKGROUND OF INVENTION

This invention relates to fastener clips for product packaging. In particular, this invention is an improvement over the clip shown and described in Liverman et al U.S. Pat. No. 7,240,406, owned in common with the invention described here and hereby incorporated by reference into this disclosure.

As the prior art clip has been widely and successfully used, efforts have been made to assure that product packages secured together by the clip will show evidence of tampering. That has been done heretofore by applying a quality or security seal, label or tape over a clip inserted into cardboard panels of a product package, to show by removal or breaking of the seal, label or tape that an attempt has been made to access the package. If such a package is transported and arrives at a destination with the tape broken or removed, then it is evident that the package has been tampered with en route and appropriate steps can be taken.

Heretofore, such tamper evident precautions have been taken with a single clip in a product package. This choice has been made due to the time and material costs of applying the indicative tape and a belief that a single instance would be a sufficient indicator. Those assumptions have now come into question and a beneficial solution found.

SUMMARY OF THE INVENTION

The present invention provides a tamper evident protection which is formed integrally with the clip, and thus will be present for all clips used in a product package and while avoiding the additional costs of prior practices. In realizing this invention, a latch portion of the clip is covered over or occluded by a frangible barrier portion formed integrally with the clip. Breakage of the frangible barrier indicates that the integrity of the package has been jeopardized.

BRIEF DESCRIPTION OF DRAWINGS

Some of the purposes of the invention having been stated, others will appear as the description proceeds, when taken in connection with the accompanying drawings, in which:

FIG. 2 is a plan view of the clip of FIG. 1; and

FIG. 3 is a side elevation view of the clip of FIGS. 1 and 2.

DETAILED DESCRIPTION OF INVENTION

Figure 1:
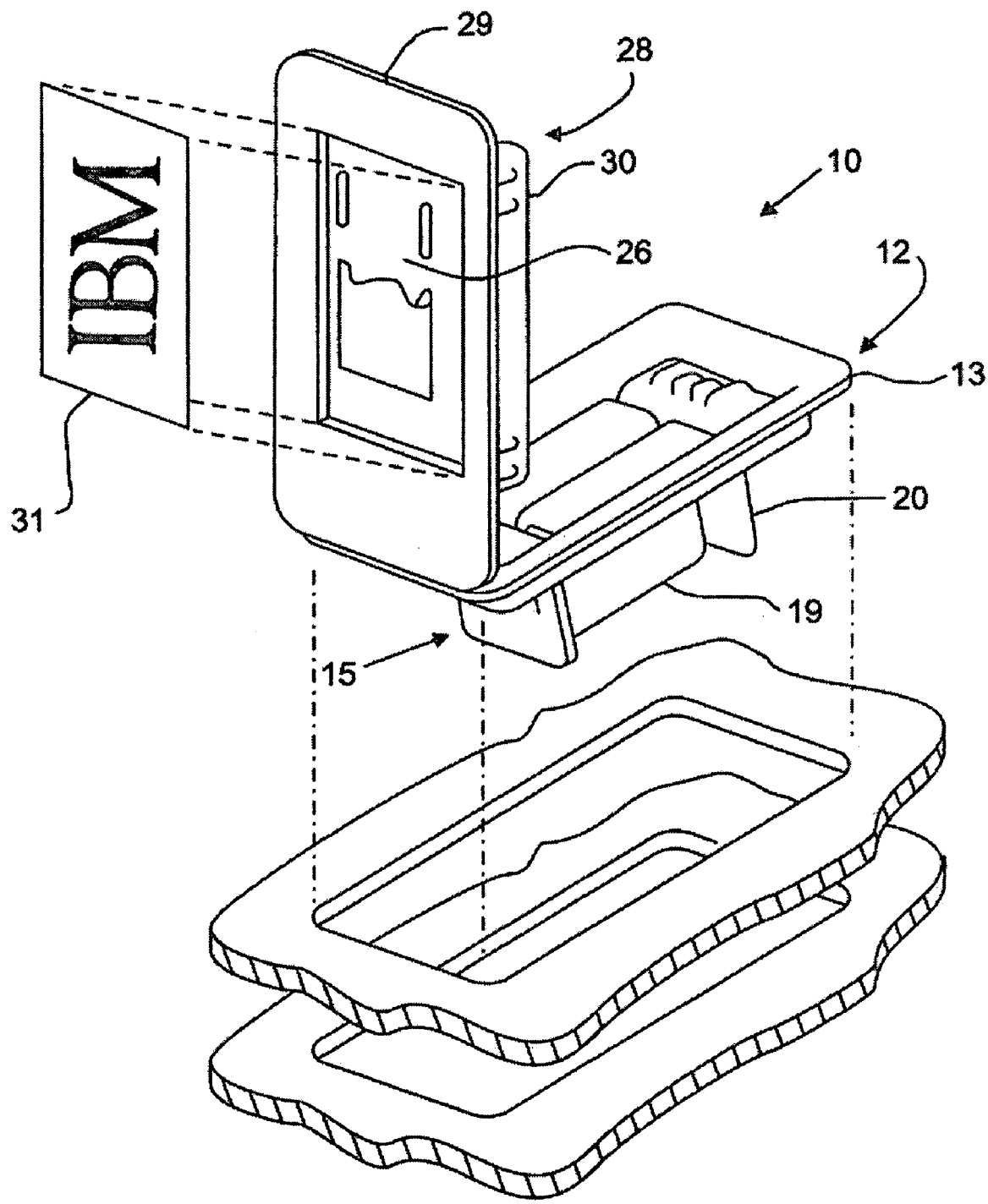
FIG. 1 is a perspective view of a first embodiment of the clip in accordance with this invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Referring now to FIG. 1 through 3, an apparatus 10 is there shown which is an improvement over the clip of the prior patent incorporated by reference into this disclosure by the provision of a tamper evidencing feature. More particularly, the apparatus has a socket body 12 having a planar portion 13, a thin walled protuberance 15 formed integrally with the planar portion and a plurality of leg portions 18, 19, 20 formed integrally with the protuberance 15 and hingedly connected thereto at an end location adjacent the planar portion. This structure corresponds generally to that shown in the prior patent. The apparatus 10 has a plug body 28 having a planar portion 29, a thin walled protuberance 30 formed integrally with the planar portion and configured to enter into the socket body, and a latch member 26 formed integrally with and hingedly connected to the planar portion 29. As with the device of the disclosure here incorporated by reference, the plug body protuberance engages the socket body leg portions upon insertion into the socket body, rotating the leg portions to extend outwardly from the socket body protuberance and lock together two pieces of a product package into which the apparatus is inserted as indicated in FIG. 1.

In accordance with an important feature of this invention, the latch member 26 is covered over or occluded by a frangible portion 31 which is subject to being broken upon movement of the latch member relative to the plug body planar portion. Should an attempt be made to access the product package during handling, the covering frangible portion, shown whole in the Figures, would be broken, immediately evidencing tampering. In this manner the purpose of this invention is realized.

Preferably, and in accordance with this invention, the clip is formed by molding a plastic material. In that process, the occluding frangible portion 31 is preferably placed into the mold prior to injection of the material forming the remaining portions of the clip, and is thus molded onto or into the plug body 28 planar portion 29. Alternatively, the mold may be configured to form the barrier portion in the same molding shot as the remainder of the clip. The occluding portion 31 may be transparent, permitting a user to inspect the clip as installed and view the latch member 26. The occluding portion 31 may be provided with an identifying logo, such as the name of the equipment manufacturer whose product is contained within a carton secured by the clip. The occluding portion 31 may be provided subsequent to molding, being attached by an adhesive or the like. It may also be provided by a strong tape or the like.

As indicated, the present invention contemplates that the socket and plug bodies may be formed integrally one with the other as in the case of the prior patent disclosure. In this case, the bodies are hingedly connected along one side edge of the planar portions, as shown.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:

a socket body having a planar portion, a thin walled protuberance formed integrally with said planar portion and a plurality of leg portions formed integrally with said protuberance and hingedly connected thereto at an end location remote from said planar portion;

a plug body having a planar portion, a thin walled protuberance formed integrally with said planar portion and configured to enter into the socket body, and a latch member formed integrally with and hingedly connected to said planar portion;

said plug body protuberance engaging said socket body leg portions upon insertion into said socket body and rotating said leg portions to extend outwardly from said socket body protuberance; and a frangible occluding portion secured to said plug body and normally overlying said latch member, said frangible portion being subject to being broken upon movement of said latch member relative to said plug body planar portion.

2. Apparatus according to claim 1 wherein said socket body and said plug body are formed integrally together and hingedly connected along a common side edge thereof.

3. Apparatus according to claim 1 wherein said plug body planar portion defines an opening opposite said plug body protuberance and said latch member occludes a portion of said opening, and further wherein said frangible occluding portion extends on and along said plug body planar portion and covers a portion of said latch member.

4. Apparatus according to claim 1 wherein said plug body planar portion defines an opening opposite said plug body protuberance and said latch member occludes a portion of said opening, and further wherein said frangible occluding portion occludes the remaining portion of said opening.

5. Apparatus according to claim 1 wherein said plug body planar portion defines an opening opposite said plug body protuberance and said latch member occludes a portion of said opening, and further wherein said frangible occluding portion is molded integrally with the remainder of said plug body planar portion.

6. Apparatus comprising:
first and second sheets of planar material forming portions of a product package; and
a tamper evident fastener penetrating said sheets and holding said sheets together, said tamper evident fastener comprising:
 a socket body having a planar portion, a thin walled protuberance formed integrally with said planar portion and penetrating said sheets and a plurality of leg portions formed integrally with said protuberance and hingedly connected thereto at an end location remote from said planar portion;
 said leg portions being rotated to extend outwardly from said socket body protuberance to capture said sheets between said socket body planar portion and said legs; and
a plug body having a planar portion, a thin walled protuberance formed integrally with said planar portion and configured to enter into the socket body, and a latch member formed integrally with and hingedly connected to said planar portion;
 said plug body protuberance engaging said socket body leg portions; and
a frangible occluding portion secured to said plug body and normally overlying said latch member, said frangible portion being subject to being broken upon movement of said latch member relative to said plug body planar portion.

7. Apparatus according to claim 6 wherein said socket body and said plug body are formed integrally together and hingedly connected along a common side edge thereof.

8. Apparatus according to claim 7 wherein said plug body planar portion defines an opening opposite said plug body protuberance and said latch member occludes a portion of said opening, and further wherein said frangible occluding portion extends on and along said plug body planar portion and covers a portion of said latch member.

9. Apparatus according to claim 7 wherein said plug body planar portion defines an opening opposite said plug body protuberance and said latch member occludes a portion of said opening, and further wherein said frangible occluding portion occludes the remaining portion of said opening.

10. Apparatus according to claim 7 wherein said plug body planar portion defines an opening opposite said plug body protuberance and said latch member occludes a portion of said opening, and further wherein said frangible occluding portion is molded integrally with the remainder of said plug body planar portion.

* * * * *